United States Patent
Guan et al.

(10) Patent No.: US 12,129,179 B2
(45) Date of Patent: Oct. 29, 2024

(54) METHOD FOR CATALYTIC SYNTHESIS OF AMMONIA UNDER NORMAL PRESSURES

(71) Applicant: ShanghaiTech University, Shanghai (CN)

(72) Inventors: Xiaofei Guan, Shanghai (CN); Zujian Tang, Shanghai (CN)

(73) Assignee: ShanghaiTech University, Shanghai (CN)

(*) Notice: Subject to any disclaimer, the term of this patent is extended or adjusted under 35 U.S.C. 154(b) by 0 days.

(21) Appl. No.: 18/034,382

(22) PCT Filed: Nov. 19, 2021

(86) PCT No.: PCT/CN2021/131847
§ 371 (c)(1),
(2) Date: Apr. 28, 2023

(87) PCT Pub. No.: WO2022/089658
PCT Pub. Date: May 5, 2022

(65) Prior Publication Data
US 2023/0312358 A1 Oct. 5, 2023

(30) Foreign Application Priority Data

Oct. 30, 2020 (CN) .......................... 202011196497.0

(51) Int. Cl.
*B01J 23/14* (2006.01)
*B01J 23/04* (2006.01)
(Continued)

(52) U.S. Cl.
CPC .............. *C01C 1/0411* (2013.01); *B01J 23/04* (2013.01); *B01J 23/14* (2013.01); *B01J 35/618* (2024.01); *C01C 1/0482* (2013.01)

(58) Field of Classification Search
CPC ... B01J 23/00; B01J 23/14; B01J 23/04; B01J 35/1028; C01C 1/0411; C01C 1/0482
See application file for complete search history.

(56) References Cited

U.S. PATENT DOCUMENTS

| 4,325,931 A | 4/1982 | Lewis |
| 2016/0138176 A1* | 5/2016 | Yoo ........................ C25B 11/075 204/239 |
| 2019/0256367 A1 | 8/2019 | Kawamura et al. |

FOREIGN PATENT DOCUMENTS

| CN | 1413908 A | 4/2003 |
| CN | 101646623 A | 2/2010 |

(Continued)

Primary Examiner — Smita S Patel
(74) Attorney, Agent, or Firm — IPRTOP LLC

(57) ABSTRACT

A method for catalytic synthesis of ammonia under normal pressures, including: performing a reaction of hydrogen and nitrogen to synthesize ammonia under normal pressures by taking a liquid alloy as a catalyst in a reactor, where the reactor contains a molten salt, the density of the molten salt is smaller than that of the liquid alloy, and the molten salt is used for providing a reaction interface and isolating the liquid alloy from being introduced impurities. The first metal reacts with the nitrogen to produce the metal nitride, and the molten salt provides a new reaction interface for the metal nitride to react with the hydrogen to synthesize ammonia, so that ammonia is produced continuously. In addition, the molten salt prevents the liquid alloy from contacting with the oxygen and the water vapor, which prevents the liquid alloy from being oxidized, thus prolonging its service life.

9 Claims, 1 Drawing Sheet

(51) Int. Cl.
*B01J 35/61* (2024.01)
*C01C 1/04* (2006.01)

(56) References Cited

FOREIGN PATENT DOCUMENTS

| | | | |
|---|---|---|---|
| CN | 109835917 A | 6/2019 | |
| CN | 112250088 | 1/2021 | |
| CN | 112266002 | 1/2021 | |
| WO | WO-2019144087 A1 * | 7/2019 | .............. B01J 23/04 |

* cited by examiner

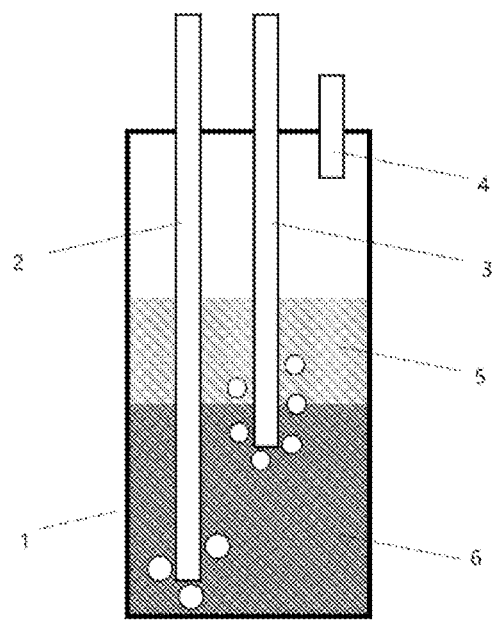

METHOD FOR CATALYTIC SYNTHESIS OF AMMONIA UNDER NORMAL PRESSURES

TECHNICAL FIELD

The present disclosure relates to the field of synthesis of ammonia, in particular, to a method for catalytic synthesis of ammonia under normal pressures.

BACKGROUND

Ammonia ($NH_3$) is an important chemical feedstock and plays an important role in the national economy, in which about 80 percent of ammonia is used for producing chemical fertilizers, and about 20 percent of ammonia is used as a raw material for other chemical products. Ammonia is mainly used for preparing nitrogen fertilizers, ammonium salts, nitric acid, cyanides, and the like. In addition, ammonia is also an important hydrogen storage material. The hydrogen content of the ammonia is up to 18% (wt. %), and the saturated vapor pressure of the ammonia is low and is only about 10 atmospheric pressures under the room temperature condition (300 K, 27° C.), so that ammonia is easier to be liquefied for storage and transportation than hydrogen. Thus, ammonia has the potential to become an important substance for energy storage and utilization and plays an important role in the future global sustainable energy deployment (MacFarlane, D. R., et al., A Roadmap to the Ammonia Economy, Joule, volume 4, pages 1186-1205, 2020).

Currently, ammonia is synthesized industrially on a large scale using the Haber-Bosch process, where hydrogen and nitrogen are utilized as raw materials, and the ammonia is prepared by reacting the nitrogen and the hydrogen under the action of an iron catalyst and the conditions of high temperatures (400-500° C.) and high pressures (100-500 atm). However, due to the high temperature and pressure conditions required by the Haber-Bosch process, the synthetic ammonia industry consumes a large amount of energy overall and also causes serious environmental problems (International Energy Agency, World Energy Outlook, 2007).

Patent CN109803923 provides a method for synthesizing ammonia using alkali metal as the catalyst, but the amount of the synthesized ammonia is very low, and the synthesis rate is also very low, therefore, it is not easy to realize the large-scale synthesis of ammonia.

SUMMARY

The present disclosure provides a method for catalytic synthesis of ammonia, which is capable of catalyzing the synthesis of ammonia from hydrogen and nitrogen using a liquid alloy as a catalyst at normal pressures (e.g., one atmospheric pressure).

The present disclosure adopts the following technical solutions.

The method for catalytic synthesis of ammonia under normal pressures, including: performing a reaction of hydrogen and nitrogen to synthesize ammonia under normal pressures by taking a liquid alloy as a catalyst in a reactor, where the reactor contains a molten salt, a density of the molten salt is less than that of the liquid alloy, and the molten salt is used for providing a reaction interface and isolating the liquid alloy from being introduced impurities.

In the present disclosure, the molten salt floating above the liquid alloy has the following functions: 1) a metal nitride generated by the reaction of the liquid alloy and nitrogen has certain solubility in the molten salt, where the nitrogen in the metal nitride, which is dissolved in the molten salt, is in the form of nitrogen ion, so that the molten salt can provide a new reaction interface for the reaction of the metal nitride and hydrogen; 2) the reactor may contain oxygen and water vapor from the outside atmosphere, and the molten salt can prevent the liquid alloy from contacting with the oxygen and the water vapor from the outside atmosphere, so that the liquid alloy is prevented from being oxidized and the service life of the liquid alloy is prolonged; 3) the feed gases (nitrogen and hydrogen) may contain small amounts of impurity gases (e.g., water vapor and oxygen) that can react with reactive metals in the liquid alloy to form metal oxides, and the density of the metal oxide is less than that of the liquid alloy and has low solubility in the liquid alloy, therefore, the metal oxide can float to the molten salt for dissolution under the action of bubbles, thus impurities in hydrogen and nitrogen can be removed and the reaction can be carried out efficiently.

In an embodiment, the molten salt is selected from one or more of LiCl, NaCl, KCl, $MgCl_2$, $CaCl_2$, $SrCl_2$, $BaCl_2$, $ZnCl_2$, $AlCl_3$, LiBr, NaBr, KBr, LiI, NaI, and KIl.

In an embodiment, the molten salt is a molten salt of LiCl and KCl.

In an embodiment, the molar ratio of LiCl to KCl is (55-60):(35-45). In an embodiment, the molar ratio of LiCl to KCl may be (55-57):(35-42), (55-57):(38-45), (56-60):(35-42), or (56-60):(38-45). The molten salt is prepared by filling one or more molten salts into a plastic bottle for mixing on a mixer to obtain a mixture; putting the mixture into an alumina crucible after the mixing, vacuuming the alumina crucible by using a mechanical vacuum pump under the protection of argon and at the temperature of 400° C., drying the alumina crucible, and cooling.

In an embodiment, the mass ratio of the molten salt to the liquid alloy is (0.02-0.9):(0.1-0.98). The mass ratio of the molten salt to the liquid alloy may be (0.02-0.3):(0.14-0.32), (0.25-0.6):(0.23-0.61), or (0.52-0.9):(0.50-0.98).

In an embodiment, the liquid alloy comprises a first metal, and a melting point of the first metal is 27-180.54° C. In the present disclosure, the first metal is an active metal and can react with nitrogen to generate the metal nitride.

In an embodiment, the first metal is an alkali metal, and the alkali metal is selected from one or more of Li, Na, K, Rb, Cs, and Fr. In an embodiment, the first metal is Li.

In an embodiment, the liquid alloy further comprises a second metal, and a melting point of the second metal is 29.77-630° C. The second metal in the present disclosure can reduce the activity of the first metal, thereby preventing the first metal from corroding the reactor, and driving the decomposition of a formed first metal hydride during the reaction.

In an embodiment, the second metal is an amphoteric metal, and the second metal is selected from one or more of Zn, Sn, Bi, Ga, In, Pb, and Sb. In an embodiment, the second metal is Sn.

In an embodiment, the molar ratio of the first metal to the second metal is (0.2-0.7):(0.3-0.8).

In an embodiment, the molar ratio of the first metal to the second metal is (0.4-0.6):(0.4-0.7). The alloy of the present disclosure is a liquid alloy formed of the first metal and the second metal.

The method for catalytic synthesis of ammonia under normal pressures of the present disclosure, including the following two steps:

1) a fixation of nitrogen, where the nitrogen reacts with the first metal to form a metal nitride, taking Li as an example, the reaction formula is $6Li+N_2=2Li_3N$. Due to the density of the metal nitride is usually less than that of the liquid alloy and the metal nitride has low solubility in the liquid alloy, the metal nitride floats up under the action of the gas bubbles.

2) the synthesis of ammonia, where the hydrogen reacts with the metal nitride to form ammonia and metal, in the case of Li, the reaction formula is $2Li_3N+3H_2=2NH_3+6Li$. The ammonia ($NH_3$) product leaves the reactor as a gas, which is then separated and collected. In addition, the reaction of hydrogen and the metal nitride also produces ammonia and metal hydrides; in the case of Li, the reaction formula is $Li_3N+3H_2—NH_3+3LiH$. And the decomposition of LiH will be promoted because the second metal reduces the activity of the first metal; in the case of Li, the reaction formula is $2LiH–2Li+H_2$. The liberated first metal can continue to react with nitrogen to form the metal nitride, which can then react with hydrogen to form ammonia. Through the above reaction steps, a continuous closed chemical loop is established, and ammonia is effectively synthesized under normal pressures without interruption.

The method for forming the liquid alloy in the present disclosure can be the prior art, heating and melting the first metal or/and a mixture of the first metal and the second metal directly in the reactor to prepare the liquid alloy, or melting the first metal or the mixture of the first metal and the second metal and then filling into the reactor in the form of the liquid alloy. Or the method may be introducing the first metal into the second metal by adopting in-situ electrolysis, specifically, where a liquid second metal is regarded as a cathode, an oxide or salt of the first metal is electrolyzed by applying a voltage, the first metal in situ is generated on the surface of the cathode of the second metal and a liquid alloy is then formed from the first metal and the second metal by diffusion.

In an embodiment of the present disclosure, not only the molten salt but also the liquid alloy formed from the first metal and the second metal is used, because the low density of the first metal enables the first metal to float up with the gas bubbles when the first metal is used alone which results in low synthesis rate and yield of ammonia, shortened service life of the first metal, and even rupture of the reactor. The second metal and the first metal can form the liquid alloy, which can effectively improve the density, in addition, prevent the first metal from corroding the ceramic reactor, and drive the decomposition of the formed first metal hydride in the reaction process.

In an embodiment, the reaction temperature in the synthesis of ammonia is 300-600° C. In an embodiment, the temperature is 400-500° C. According to thermodynamic analysis, an excessively high temperature is not favorable for ammonia synthesis and collection. In addition, according to kinetic analysis, an excessively low temperature in turn decreases the synthesis rate of the ammonia reaction, and therefore a suitable reaction temperature range should be selected.

In an embodiment, a third metal is further used in the catalytic reaction, where a melting point of the third metal is higher than that of the first metal. The third metal in the liquid alloy exists in a solid state and is used for activating reaction gas, and the third metal is a transition metal. The third metal has a high specific surface area (6500-8000 $cm^2/g$). The third metal may promote the activity of the nitrogen and hydrogen molecules and may have catalytic activity for ammonia synthesis. Specifically, the third metal may be a foamed nickel and is fixed at gas outlet parts of nitrogen and hydrogen. The third metal may also be placed in the liquid alloy in the form of a wire mesh, or the third metal is mixed directly with the first metal and the second metal.

In an embodiment, the third metal is selected from one or more of Ni, Fe, Mo, Co, Ru, Re, and Pt.

In an embodiment, the mass ratio of the third metal to the liquid alloy is (0.1-10):(90-99.9). In an embodiment, the mass ratio of the third metal to the liquid alloy is (0.3-7): (94-96).

In an embodiment, the flow rate ratio of the nitrogen to the hydrogen is (1-99):(1-99).

In an embodiment, the flow rate ratio of the nitrogen to the hydrogen is 1:(2-50).

In an embodiment, nitrogen and hydrogen are introduced into the liquid alloy in at least two ways:
one is introducing the nitrogen and the hydrogen into the liquid alloy through different gas pipes, respectively, where the nitrogen is introduced into a bottom of the liquid alloy, and the hydrogen is introduced into an upper part of the liquid alloy or the molten salt;
the other one is introducing nitrogen and hydrogen into the liquid alloy through a gas pipe after mixing the nitrogen and hydrogen.

In an embodiment, the flow velocity of the nitrogen is 5-100 $cm^3/min$, and the flow velocity of the hydrogen is 5-100 $cm^3/min$.

In an embodiment, the reaction is carried out under a protective gas, which is used to prevent the decomposition of ammonia. The protective gas is selected from one of nitrogen, hydrogen, and inert gas. The flow velocity of the protective gas is 60-100 $cm^3/min$. The generated ammonia can leave the high-temperature area of the reactor quickly by the purging of the protective gas, and the decomposition of ammonia generated by the catalytic reaction can be alleviated.

The present disclosure provides a reaction device of the method for catalytic synthesis of ammonia under normal pressures, including: a reactor, a heating mechanism for providing a heat source, a hydrogen source, and a nitrogen source.

In an embodiment, the reaction device includes a reactor, a nitrogen gas pipe, and a hydrogen gas pipe, where the nitrogen gas pipe and the hydrogen gas pipe penetrate through the reactor and extend into the reactor.

In an embodiment, an upper part of the reactor is provided with a product gas outlet. In an embodiment, the product gas outlet is connected to an ammonia collecting system for avoiding the pollution of the environment and the unsafe factors caused by the ammonia discharge. More specifically, the ammonia collecting system is a tank containing an aqueous acid solution.

In an embodiment, the reaction device is further provided with a protective gas pipe, and a gas inlet end of the protective gas pipe is connected with a protective gas source, and a gas outlet end of the protective gas pipe penetrates through the reactor and extends into the reactor.

In order to ensure that the reaction temperature in the reaction process maintains at 300-600° C., the reactor can be transferred to a heating system such as a tubular furnace for heating.

Compared with the prior art, the present disclosure has the following beneficial effects:

1) the catalyst of the present disclosure uses alkali metal with high activity, which reacts with nitrogen easily to generate alkali metal nitride, therefore, ammonia can be synthesized under normal pressures, in addition, the alkali metal is more widely available and requires lower cost compared with noble metal catalysts.

2) The second metal in the present disclosure can reduce the activity of the first metal, so that the first metal can be prevented from corroding the reactor, and the decomposition of the formed hydride of the first metal in the reaction process can be driven.

3) In the catalytic reaction, the molten salt can provide a new reaction interface for the synthesis of ammonia prepared from the reaction of the metal nitride and the hydrogen, so that the metal nitride can continuously generate ammonia, and the reaction rate and the synthesis amount of the ammonia can be effectively improved, in addition, the molten salt can prevent the liquid alloy from contacting with oxygen and water vapor of the outside atmosphere, so as to prevent the oxidization of the liquid alloy and prolong the service life of the liquid alloy.

4) In the catalytic reaction of the present disclosure, the density and the solubility of the generated first metal nitride formed in the nitrogen fixation reaction are low, therefore, the first metal nitride can float upwards along with bubbles, and the generated first metal nitride can then react with hydrogen to synthesize ammonia, where the first metal hydride is decomposed into the first metal and the hydrogen under the action of the second metal, thus a continuous closed chemical loop is realized, and the ammonia can be effectively synthesized under normal pressures without interruption.

5) The process and design of the synthesis ammonia reaction of the present disclosure are simple, and reaction conditions are relatively mild, therefore, large-scale synthesis of ammonia can be easily realized.

BRIEF DESCRIPTION OF THE DRAWINGS

FIG. 1 shows a schematic diagram of the structure of a reaction device according to the present disclosure.

REFERENCE NUMERALS

1—reactor,
2—nitrogen gas pipe,
3—hydrogen gas pipe,
4—product gas outlet,
5—molten salt,
6—liquid alloy.

DETAILED DESCRIPTION

The specific embodiments will be described below to illustrate the implementation of the present disclosure. Those skilled can easily understand other advantages and effects of the present disclosure according to the contents disclosed by the specification.

Before the detailed description of the embodiments of the present disclosure, it needs to understand that the protection scope of the present disclosure is not limited to the specific exemplary embodiments described below. It should further understand that the specific terms used in the embodiments are just for the description of the present disclosure, rather than limiting the protection scope of the present disclosure. Unless otherwise stated, unspecified experiments in the following embodiments are carried out under conventional conditions or conditions recommended by the respective manufacturers.

When numerical ranges are given in the description, it should understand that, unless otherwise indicated herein, both endpoints of each numerical range and any number between the two endpoints may be selected for use. Unless otherwise defined, all technical and scientific terms used in this disclosure have the same meaning as understood by those skilled in the art from the prior art, and the present disclosure can also be implemented by any methods, devices, and materials of the prior art similar or equivalent to those described in the embodiments.

In one embodiment of the present disclosure, the liquid alloy is a prefabricated Li—Sn alloy, specifically: 1) 6.87 g of Li and 78.32 g of Sn were mixed and placed in a crucible in an argon glove box; 2) a mixture of 1.52 g of LiCl and 1.86 g of KCl were mixed to cover the surface of the mixture of Li and Sn, so as to isolate the metal from the atmosphere; 3) the whole crucible was transferred into a tube furnace, then heated to 500° C. for 12 hours under the protection of argon, afterward cooled to room temperature, and LiCl and KCl were removed to obtain the prefabricated Li—Sn alloy, where the molar ratio of Li to Sn was 60:40.

In one embodiment of the present disclosure, the molten salt is a prefabricated LiCl—KCl molten salt, specifically: 1) 100 g of anhydrous LiCl and 122 g of anhydrous KCl were weighed, then filled into a plastic bottle, afterward mixed on a mixer for 24 hours; 2) after the mixing, the salt was put into an alumina crucible, then vacuumized by a mechanical vacuum pump under the protection of argon and at the temperature of 400° C., and dried for 24 hours; 3) the cooled salt sample was transferred into a glove box to obtain the prefabricated LiCl—KCl molten salt, where the molar ratio of LiCl to KCl in the LiCl—KCl molten salt is 59:41. For the purpose of the present disclosure, any molten salt whose density is lower than that of the liquid alloy and which can provide a reaction interface and isolate the liquid alloy to avoid introducing impurities into the reaction environment can achieve the technical effect of the LiCl—KCl molten salt.

Embodiment 1

The embodiment discloses a specific reaction device for catalytic synthesis of ammonia under normal pressures, which includes a reactor, a heating mechanism for providing a heat source, a hydrogen source, and a nitrogen source.

FIG. 1 is a schematic structural diagram of the reaction device of the present disclosure, where the reaction device includes a reactor 1, a nitrogen gas pipe 2, and a hydrogen gas pipe 3, the upper part of the reactor 1 is provided with a product gas outlet 4, and the nitrogen gas pipe 2 and the hydrogen gas pipe 3 penetrate through the reactor 1 and extend into the reactor 1.

In order to avoid the pollution of the environment and the unsafe factors caused by the emission of ammonia, the product gas outlet 4 is communicated with an ammonia collecting system, such as a collecting tank containing an aqueous acid solution.

In order to realize the synthesis process of the present disclosure, the reactor is made of alumina.

In order to heat and melt the alloy into a liquid alloy used as the catalyst in the reactor 1 and eliminate the influence of the gas in the reactor 1 on the oxidation of the liquid alloy and the like in the process, the reaction device may further include a protective gas pipe, where a gas inlet end of the protective gas pipe is communicated with a protective gas source, and a gas outlet end of the protective gas pipe penetrates through the reactor 1 and extends into the reactor 1. The protective gas can be argon, nitrogen, hydrogen, or inert gas. Similarly, the protective gas pipe is made of alumina.

In a case where ammonia is synthesized under normal pressures using the above-described apparatus, a solid alloy serving as the catalyst was put into the reactor 1, then the surface of the alloy was covered with the molten salt 5, afterward, the solid alloy was heated under the protection of argon to form the liquid alloy, where the gas inlet end of the nitrogen gas pipe 2 was communicated with the nitrogen source, and the gas outlet end of the nitrogen gas pipe 2 was positioned in the liquid alloy 6. The gas inlet end of the hydrogen gas pipe 3 was communicated with the hydrogen source, the gas outlet end of the hydrogen gas pipe 3 was positioned in the liquid alloy 6 or the molten salt 5, and ammonia generated by the reaction was collected through the product gas outlet 4.

The reaction temperature was set at 300-600° C. in the reaction process. And the reactor can be transferred to the heating system such as a tubular furnace for heating.

In Embodiments 2-4 and Control Examples 1-2 of the present disclosure, the reactor 1 was employed to perform the catalytic reaction. However, it should be noted that the reactor is not limited to the reactor described in the present disclosure, any reactor, apparatus, or equipment which can enable the introduction of nitrogen and hydrogen and the synthesis of ammonia using the liquid alloy as the catalyst under normal pressures can achieve the object of the present disclosure.

Embodiment 2

In this embodiment, the Li—Sn liquid alloy served as the catalyst, and the molten salt of LiCl—KCl was added to synthesize ammonia under normal pressures.

In this embodiment, the catalytic reaction steps of the method for catalytic synthesis of ammonia under normal pressures were as follows:

1) in an argon glove box, 21.3 g of the prefabricated Li—Sn alloy and 8.46 g of the prefabricated LiCl—KCl molten salt were weighed, and then loaded into the reactor.

2) The reactor was transferred to the tube furnace. Argon was first introduced into the reactor at the flow velocity of 5 cm$^3$/min, then the reactor was heated to 500° C. at the speed of 4° C./min to enable the prefabricated Li—Sn alloy to become the Li—Sn liquid alloy before stopping introducing argon. Nitrogen was introduced into the bottom of the Li—Sn liquid alloy at the flow velocity of 5 cm$^3$/min through the nitrogen gas pipe, and hydrogen was introduced into the upper part of the Li—Sn liquid alloy at the flow velocity of 15 cm$^3$/min through the hydrogen gas pipe. The reaction was carried out at 500° C. and normal pressures for 24 hours. And the product ammonia was introduced into a dilute sulfuric acid aqueous solution through the product gas outlet for the collection of the ammonia, where the concentration of the dilute sulfuric acid aqueous solution was 0.1 mol/L, and the volume was 20 ml.

The results were as follows: the content of ammonium ions in the dilute sulfuric acid aqueous solution was determined to be 182.22 mg/l by ion chromatography. The synthesis rate of ammonia was then calculated to be 143.41 μg/h, which shows that the ammonia can be efficiently synthesized under normal pressures with the addition of the molten salt and the liquid alloy used as the catalyst.

Compared with the method for synthesizing ammonia in Patent CN10980392.3, where only liquid pure sodium was adopted under the condition of 500° C. and normal pressures, the synthesis rate of ammonia in the embodiment of the present disclosure is improved by 5 times.

Embodiment 3

In this embodiment, the Li—Sn liquid alloy served as the catalyst, and the molten salt of LiCl—KCl was added to synthesize ammonia under normal pressures.

In this embodiment, the catalytic reaction steps of the method for catalytic synthesis of ammonia under normal pressures were as follows:

1) in the argon glove box, 11.76 g of the prefabricated Li—Sn alloy was weighed, and 26.97 g of Sn was weighed, afterward, the prefabricated Li—Sn alloy and Sn were mixed so that the molar ratio of Li to Sn was 30:70, then 3.38 g of the prefabricated LiCl—KCl molten salt was weighed, and the above materials were successively filled into the reactor.

2) The reactor was transferred to the tube furnace. Argon was first introduced into the reactor at the flow velocity of 5 cm$^3$/min, then the reactor was heated to 400° C. at the speed of 4° C./min to enable the prefabricated Li—Sn alloy to become the Li—Sn liquid alloy before stopping introducing argon. Nitrogen was then introduced into the bottom of the Li—Sn liquid alloy at the flow velocity of 5 cm$^3$/min through the nitrogen gas pipe, and hydrogen was then introduced into the molten salt at the flow velocity of 15 cm$^3$/min through the hydrogen gas pipe. The reaction was carried out at 400° C. and normal pressures for 24 hours. And the product ammonia was introduced into the dilute sulfuric acid aqueous solution through the product gas outlet for the collection of the ammonia, where the concentration of the dilute sulfuric acid aqueous solution was 0.1 mol/L, and the volume was 20 ml.

The results were as follows: the content of ammonium ions in the dilute sulfuric acid aqueous solution was measured to be 3.9 mg/l by ion chromatography. The synthesis rate of ammonia was then calculated to be 2.66 μg/h, which shows that the liquid alloy used as the catalyst can catalyze and synthesize ammonia efficiently under normal pressures with the addition of the molten salt. The synthesis rate of this embodiment is less than that of Embodiment 2, primarily due to the relatively low reaction temperature, which results in a lower reaction rate. In addition, the addition of small amounts of the molten salts and a low lithium content in the liquid alloy also reduce the rate of catalytic synthesis of ammonia and the ammonia content.

Embodiment 4

The catalytic reaction steps and conditions in this embodiment were the same as in Embodiment 2. However, 0.126 g of a foamed nickel was fixed at the outlet ends of the hydrogen and nitrogen gas pipes by nickel wires. As the third metal, the foamed nickel was used to activate the reaction gas.

The results were as follows: the content of ammonium ions in the dilute sulfuric acid aqueous solution was determined to be 189.47 mg/l by ion chromatography. The synthesis rate of ammonia was calculated to be 149.12 μg/h. The content of ammonia and the synthesis rate of ammonia were both improved compared with Embodiment 2 in which the third metal was not introduced. This shows that the introduction of the third metal (the foamed nickel) in the reaction further promotes the ammonia synthesis reaction.

Control Example 1

In control example 1, the Li—Sn liquid alloy served as the catalyst, and the ammonia was synthesized at normal pressures.

The catalytic reaction steps for synthesizing ammonia were as follows:

1) in the argon glove box, 21.3 g of the prefabricated Li—Sn alloy was charged into the reactor.
2) The reactor was transferred to the tube furnace. Argon was first introduced into the reactor at the flow velocity of 5 cm³/min, then the reactor was heated to 500° C. at the speed of 4° C./min to enable the prefabricated Li—Sn alloy to become the Li—Sn liquid alloy before stopping introducing argon. Nitrogen was then introduced into the bottom of the Li—Sn liquid alloy at the flow velocity of 5 cm³/min through the nitrogen gas pipe, and hydrogen was then introduced into the Li—Sn liquid alloy at the flow velocity of 15 cm³/min through the hydrogen gas pipe. The reaction was carried out at 500° C. and normal pressures for 24 hours. And the product ammonia was led into the dilute sulfuric acid aqueous solution through the product gas outlet to collect the ammonia, where the concentration of the dilute sulfuric acid aqueous solution was 0.1 mol/L, and the volume was 20 ml.

The experimental results were as follows: the content of ammonium ions in the dilute sulfuric acid aqueous solution was measured to be 4.22 mg/l by ion chromatography. The synthesis rate of ammonia was then calculated to be 3.32 µg/h. The synthesis rate of ammonia in the control example 1 was much less than the synthesis rate of Embodiment 2, indicating that molten salts play an important role in the catalytic synthesis of ammonia at normal pressures. The function of the molten salt in ammonia synthesis has the following three advantages: 1) lithium nitride has certain solubility in the molten salt, where nitrogen in the lithium nitride is dissolved in the molten salt and in the form of nitrogen ions, so that the molten salt can provide a new reaction interface for the reaction of the lithium nitride and hydrogen; 2) the reactor contains oxygen and water vapor from the outside atmosphere, and the molten salt can prevent the liquid alloy from contacting with the oxygen and the water vapor of the outside atmosphere, so that the liquid alloy is prevented from being oxidized and the service life of the liquid alloy is prolonged; 3) the feed gases (nitrogen and hydrogen) may contain small amounts of impurity gases (e.g., water vapor and oxygen) that can react with the reactive metal in the liquid alloy to form metal oxides, due to the density of the metal oxide is lower than that of the liquid alloy and the metal oxide has low solubility in the liquid alloy, the metal oxide can float to the molten salt for dissolution under the action of bubbles, thus impurities in hydrogen and nitrogen can be removed and the reaction can be carried out efficiently.

The ammonia content in Embodiment 2 was increased by 43 times and the ammonia synthesis rate was also increased by 43 times compared to the control example 1 in which no molten salt was added.

Control Example 2

In control example 2, Sn served as the catalyst, LiCl—KCl molten salt was added, and ammonia was synthesized at normal pressures.

The catalytic reaction steps for synthesizing ammonia were as follows:

1) in the argon glove box, 45.87 g of Sn and 3.38 g of the prefabricated molten salt LiCl—KCl were weighed and loaded into the reactor.
2) The reactor was transferred to the tube furnace. Argon was first introduced into the reactor at the flow velocity of 5 cm³/min, and the reactor was heated to 400° C./min at the speed of 4° C./min before stopping introducing argon. Nitrogen was then introduced into the bottom of the Sn liquid alloy at the flow velocity of 5 cm³/min through the nitrogen gas pipe, and hydrogen was introduced into the molten salt at the flow velocity of 15 cm³/min through the hydrogen gas pipe. The reaction was carried out at 400° C. and normal pressures for 24 hours. And the product ammonia was introduced into the dilute sulfuric acid aqueous solution through the product gas outlet for the collection of the ammonia, where the concentration of the dilute sulfuric acid aqueous solution was 0.1 mol/L, and the volume was 20 ml.

The experimental results were as follows: the content of ammonium ions in the dilute sulfuric acid aqueous solution was measured to be 1.77 mg/l by ion chromatography. The synthesis rate of ammonia was calculated to be 1.40 µg/h. The synthesis rate of ammonia in control example 2 is less than the synthesis rate of ammonia in Embodiment 2, indicating that the first metal lithium and the molten salt cooperated in the catalytic process play an important role in the catalytic synthesis of ammonia at normal pressures.

The above embodiments are intended to illustrate the implementations of the present disclosure and should not be construed as a limitation to the present disclosure. In addition, various modifications and changes to the embodiments in the present disclosure can be made by those skilled in the art without departing from the scope and spirit of the present disclosure. Therefore, various modifications and changes made by one skilled in the art without departing from the scope and spirit of the present disclosure should be included within the scope of the present disclosure.

What is claimed is:

1. A method for catalytic synthesis of ammonia under normal pressures comprising:
    performing a reaction of a hydrogen and nitrogen to synthesize ammonia under normal pressures by taking a liquid alloy as a catalyst in a reactor,
    wherein the reactor contains a molten salt, a density of the molten salt is less than that of the liquid alloy,
    wherein the molten salt providing a reaction interface, and
    wherein a mass ratio of the molten salt to the liquid alloy is (0.02-0.9):(0.1-0.98).

2. The method for catalytic synthesis of ammonia under normal pressures according to claim 1, wherein the molten salt is selected from one or more of LiCl, NaCl, KCl, $MgCl_2$, $CaCl_2$), $SrCl_2$, $BaCl_2$, $ZnCl_2$, $AlCl_3$, LiBr, NaBr, KBr, LiI, NaI, and KI.

3. The method for catalytic synthesis of ammonia under normal pressures according to claim 1, wherein the liquid alloy comprises a first metal, and a melting point of the first metal is 27-180.54° C.;
    and/or the liquid alloy also comprises a second metal, and a melting point of the second metal is 29.77-630° C.

4. The method for catalytic synthesis of ammonia under normal pressures according to claim 3, wherein the first metal is an alkali metal, and the alkali metal is selected from one or more of Li, Na, K, Rb, Cs, and Fr;
    and/or the second metal is an amphoteric metal, and the second metal is selected from one or more of Zn, Sn, Bi, Ga, In, Pb, and Sb.

5. The method for catalytic synthesis of ammonia under normal pressures according to claim 3, wherein a molar ratio of the first metal to the second metal is (0.2-0.7):(0.3-0.8).

6. The method for catalytic synthesis of ammonia under normal pressures according to claim 3, wherein the liquid alloy further comprises a third metal, a melting point of the third metal is higher than that of the first metal, and the third metal in the liquid alloy is in a solid form for activating the hydrogen and the nitrogen; and wherein the third metal is a transition metal.

7. The method for catalytic synthesis of ammonia under normal pressures according to claim 6, wherein a specific surface area of the third metal is 6500-8000 $cm^2/g$.

8. The method for catalytic synthesis of ammonia under normal pressures according to claim 1, wherein a reaction temperature of the catalytic synthesis of ammonia is 300-600° C.

9. The method for catalytic synthesis of ammonia under normal pressures according to claim 1, wherein the nitrogen is introduced into the liquid alloy through a nitrogen gas pipe, and the hydrogen is introduced into the liquid alloy or the molten salt through a hydrogen gas pipe.

* * * * *